United States Patent [19]

Richards et al.

[11] Patent Number: 4,758,172

[45] Date of Patent: Jul. 19, 1988

[54] POWER DISTRIBUTION BUSWAY SYSTEM

[75] Inventors: Anthony L. Richards, Southington; Conrad R. Turmelle, Farmington, both of Conn.

[73] Assignee: General Electric Company, New York, N.Y.

[21] Appl. No.: 107,320

[22] Filed: Oct. 13, 1987

[51] Int. Cl.⁴ ............................................. H01R 25/14
[52] U.S. Cl. ................................... 439/212; 174/72 B
[58] Field of Search .................. 174/68 B, 70 B, 71 B, 174/72 B, 88 B, 99 B, 129 B, 133 B; 439/114, 212, 213; 361/341, 342, 355, 361, 378

[56] References Cited

U.S. PATENT DOCUMENTS

| | | | |
|---|---|---|---|
| 3,264,403 | 8/1966 | Erdle | 174/72 B |
| 3,391,378 | 7/1968 | Fisher | 439/212 |
| 3,476,871 | 11/1969 | Erdle | 174/72 B |
| 3,489,846 | 1/1970 | Fehr, Jr. | 174/88 |

OTHER PUBLICATIONS

"Laminated and Molded Bus Bars for Power Distribution", Tech. Bull. B-1, Eldre Components, Inc., Mar. 17, 1965.

Primary Examiner—Gil Weidenfeld
Assistant Examiner—Gary F. Paumen
Attorney, Agent, or Firm—Richard A. Menelly; Walter C. Bernkopf; Fred Jacob

[57] ABSTRACT

An electric power busway system includes a plurality of closely spaced bus bar conductors with each bus conductor having at least one integrally formed contact blade extending therefrom. The contact blades engage corresponding contact spring type receiver stabs within a power take-off assembly with interphase insulators arranged between the corresponding blade receiver stabs.

7 Claims, 3 Drawing Sheets

POWER DISTRIBUTION BUSWAY SYSTEM

BACKGROUND OF THE INVENTION

Electric power busway used within industrial power distribution systems generally consist of a plurality of rectangular copper or aluminum bars closely spaced and separated by means of an electrically insulative coating. Every two feet or so, the bars are shaped to provide a spaced gap between the individual bars and the bottom edge of each of the bars is abraded to remove the insulative material and expose a contact region on both flat sides of the bar. This exposed contact is then tin or silver-plated to provide an electric contact blade for connection with a power take-off assembly which includes a corresponding plurality of blade receiver stabs which mate with the blade portions of the shaped bars. The air gaps between the shaped bars provide sufficient electrical insulative spacing to prevent arcing between the different phases of a multi-phase power system wherein each bar carries one-phase of the system current. The so-called "expanded connector region" containing the shaped bars effectively provide electrical access to the busway by means of the contact blades. When a four-bus power distribution system is employed, the added length for each expanded connector region corresponds to an increase of approximately six percent for each bar. For the four-bus power distribution system, this represents an equivalent six percent increase in the weight of conductor material over an equivalent linear distance spanned by the closely spaced bars within the remaining extent of the bus system. For the long lengths of busway required in most industrial operations, the amount of extra conductor material required to provide sufficient expanded connector regions is substantial.

One purpose of the instant invention therefore, is to provide a power bus system which allows interconnection with a plurality of power take-off assemblies without increasing the amount of conductor material at each power take-off position.

SUMMARY OF THE INVENTION

Rectangular power bus conductors within a closely-spaced power bus system are each shaped to include an extending conductor blade to provide a power take-off region for electrical connection with a power take-off assembly without increasing the amount of copper material used within the power bus system. Each conductor blade is offset from the preceding blade within the power take-off region to provide sufficient interphase air gap over the surface for electrical insulation purposes. The corresponding closely-spaced blade receiver stabs within the power take-off assembly are recessed within the assembly enclosure and are electrically insulated from each other by means of separate insulating shields.

GENERAL DESCRIPTION OF THE INVENTION

Figure 1:
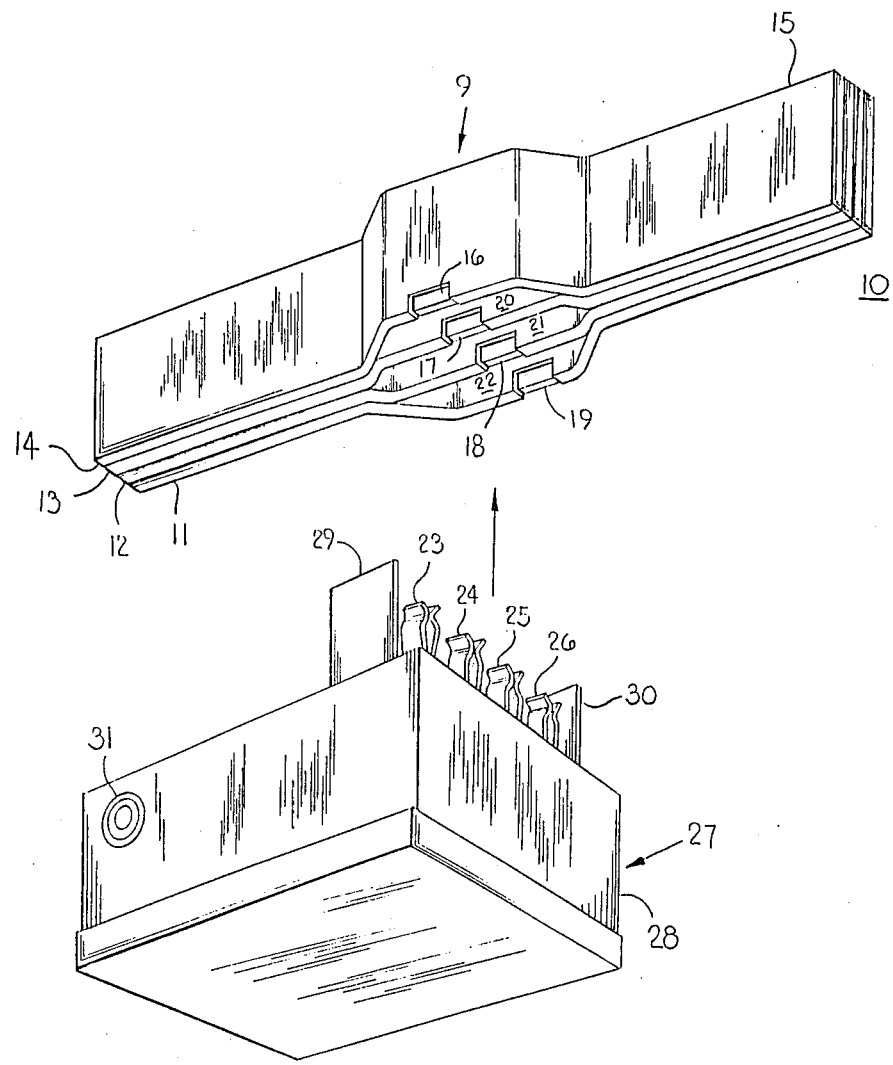
FIG 1. is a bottom perspective view of a multiphase busway system and power take-off assembly according to the prior art.

Before describing the electric power busway system of the invention, it is helpful to describe one example of a power busway system 10 as currently employed which is depicted in FIG. 1. The busway system usually includes four bus bar conductors 11-14 (hereafter "bars"), each carrying a separate phase of a multi-phase power distribution system and each containing an insulative coating 15 to electrically insulate the bars from each other and the housing (not shown). An expanded connector region 9 is shown along the bars wherein each of the bars is shaped to define corresponding spaces 20, 21, 22 and the insulation is removed to expose a copper or aluminum contact blade 16-19 which is subsequently tin or silver-plated. These expanded connector regions 9 are arranged every two feet or so to accommodate a power take-off assembly 27 for delivering power to associated electrical equipment. A commonly employed power take-off assembly generally comprises a metallic enclosure 28 which supports three or four corresponding spring type contact blade receiver stabs 23-26 which are electrically insulated from each other and from the enclosure blade. A pair of metal grounding plates 29, 30 are provided outboard of the receiver stabs. A knock-out 31 is formed within one side of the enclosure to allow for wire connection between the contact blade receiver stabs and the associated electrical equipment. When electrical interconnection is made between two separate power busway systems, a similar expanded connector region with the contact blades omitted is employed. One such power busway interconnecting arrangement is described within U.S. Pat. No. 3,489,846 entitled "Busway Joint Cover with Expansion Accommodating Means". This patent is incorporated herein for purposes of reference and should be reviewed for its teachings of busway joint connectors.

DESCRIPTION OF THE PREFERRED EMBODIMENT

Figure 2A:
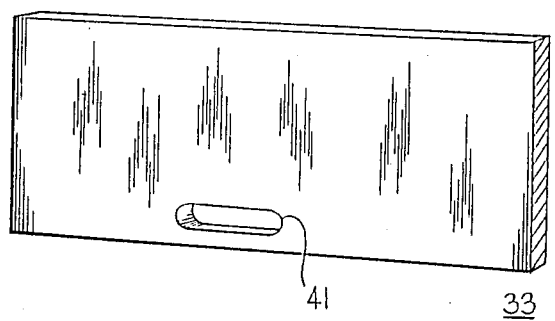
FIGS. 2A-2C are front perspective views of a shaped bus bar conductor according to the invention.
Figure 2B:
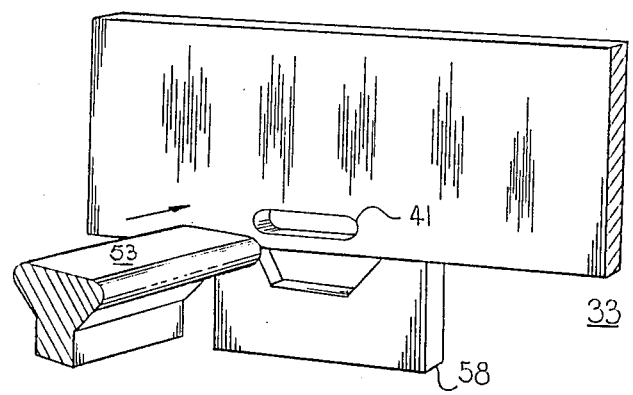
Figures 2C, 3A, 3B:
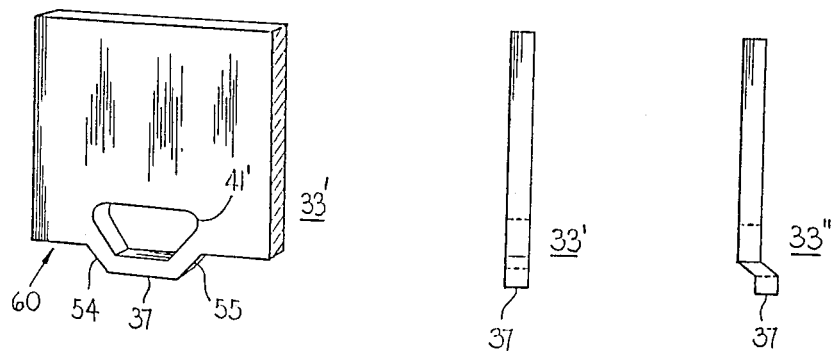
FIGS. 3A and 3B are end views of the shaped bus bars of FIGS. 2A, 2C.

The formed bus bar conductor of the invention hereafter, "formed bar", is depicted in FIGS. 2A-2C and comprises a rectangular bar 33 of copper or aluminum material that is first provided with a rectangular slot 41 by means of a punching or cutting operation. A forming tool 53 is next inserted within the rectangular slot and a downward or sideward pressure is applied to the bar by means of the forming tool. The edge of the bar is supported by means of a back-up block 58, such that the material under the rectangular slot is forced outward as depicted in FIG. 2C wherein a truncated aperture 41' separates the planar blade extension 37 from the body 60 of the formed bar 33'. A pair of angular side pieces 54, 55 are formed along with the planar blade extension 37. An insulative epoxy coating is selectively applied to all surfaces of the formed bar 33' except for the planar blade extension 37 which is subsequently tin-plated or silver-plated to facilitate electrical contact with the spring type blade extensions and to deter surface erosion effects. The blade extension 37 could be coplanar with the remainder of the formed bar 33' as depicted in FIG. 3A or offset therefrom as depicted at 33" in FIG. 3B.

Figure 4:
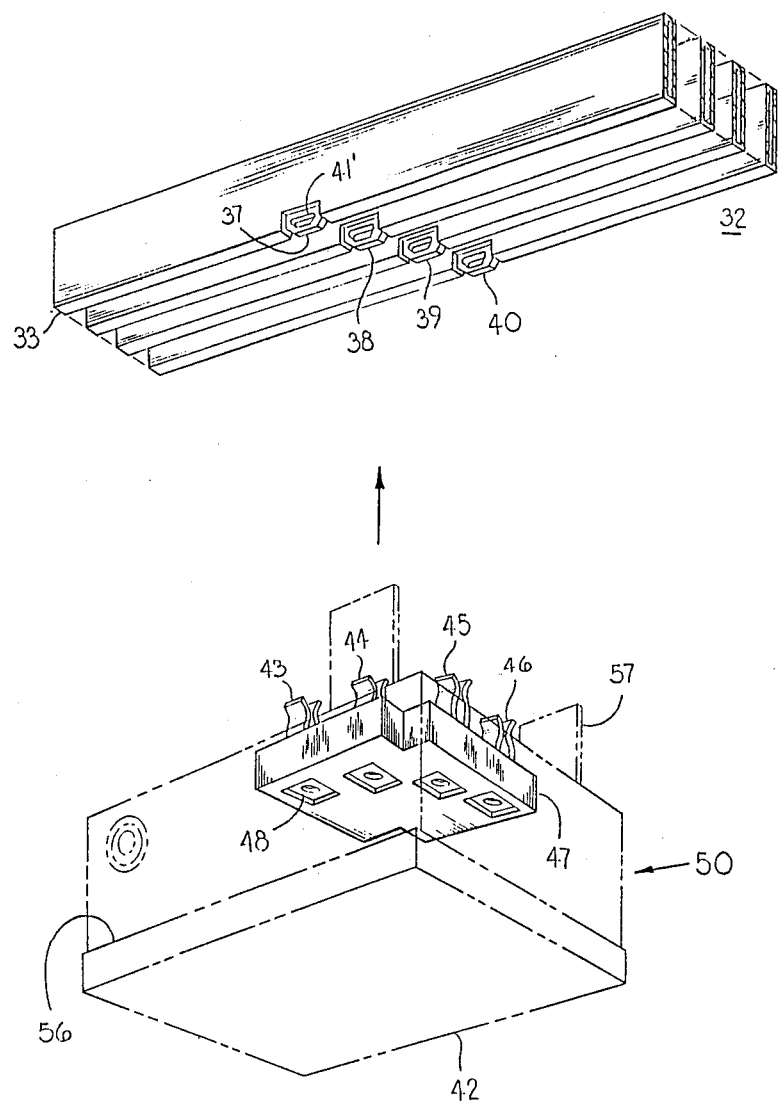
FIG. 4 is a bottom perspective view of the shaped bus bar according to the invention prior to connecting with a corresponding power take-off assembly.

To assemble a formed busway system 32 as shown in FIG. 4, three or four such formed bars 33' are arranged such that their respective planar blade extensions 37-40 are spaced apart to provide sufficient separation to electrically insulate the blade extensions from each other. A power take-off assembly 50 interconnects with the busway system by means of the contact blade receiver stabs 43-46 that are arranged within the receiver enclosure 42 and the grounding plates are arranged outboard of the receiver stabs. The contact blade receiver stabs are electrically connected with corresponding conducting straps 48 and are electrically insulated from the bottom 56 of the enclosure by means of insulative support 47. Corresponding pairs of insulating shields 57 serve to electrically isolate the blade extensions 37-40 and contact blade receiver stabs 43-46 when interconnected. The formed power busway system of the invention, as shown at 32 is found to operate at a lower temperature than the prior art bus system depicted at 10 in FIG. 1. The close spacing between the formed bars 33' allows for a uniform distribution of heat along the entire extent of the bus system 32 in contrast to the localized heating that occurs within the expanded connector region 9 of the prior art busway system 10. The dead air spaces 20-22 provide good thermal insulation for the heat generated through contact resistance inherent within the contact blades 16-19. The thermal insulation then allows the temperature to increase measurably higher in the vicinity of the expanded connector region 9 than in the remainder of the busway system. Conversely, the truncated apertures 41' within formed bars 33' provide effective cross-ventilation of the ambient air to carry the heat away from the blade extensions 37-40 when the formed busway system 32 is connected with the power take-off assembly 50. Further, the closely spaced arrangement of the formed bus conductors 33' deters magnetic heating effects that occur between the prior art bars 11-14 when the bars are separated to form the expanded connector region. The lower heat generation properties of the formed busway system 32 further reduces the voltage loss that occurs when large linear extents of bus conductors having expanded connector regions.

Having thus described my invention, what I claim as new and desire to secure by Letters Patent is:

1. An electric bus bar comprising:
   a rectangular metal bar including a double-edged body member;
   slot means defining an opening through said body member through one edge thereof; and
   contact blade means integral with said metal bar and extending from said one edge on a side of said slot opposite said body member.

2. The electric bus bar of claim 1 including a pair of angulated side arms integral with said contact blade and extending on either side thereof.

3. The electric bus bar of claim 1 wherein said slot means comprises a truncated slot.

4. An electric bus bar system comprising:
   a plurality of rectangular metal bars arranged side-by-side in a linear array, each of said metal bars being electrically insulated on both sides and each of said metal bars including an integrally formed contact blade extending from one edge thereof; and
   means defining an opening through each of said metal bars through said one edge and said integrally formed contact blade forming one side of said opening.

5. The electric bus bar system of claim 4 wherein each of said integrally formed contact blades are offset from each other.

6. The electric bus bar system of claim 4 wherein said opening comprises a truncated slot.

7. The electric bus bar system of claim 4 including a tin or silver coating on each of said contact blades.

* * * * *